Nov. 5, 1968   W. W. WEESE   3,409,050

FLOW RESTRICTOR

Filed Oct. 21, 1965

INVENTOR
WILFRED W. WEESE,

BY
Burns, Doane, Benedict, Swecker & Mathis
ATTORNEYS

United States Patent Office 3,409,050
Patented Nov. 5, 1968

3,409,050
FLOW RESTRICTOR
Wilfred W. Weese, Flushing, N.Y., assignor to
Harry Swartz, New York, N.Y.
Filed Oct. 12, 1965, Ser. No. 499,540
8 Claims. (Cl. 138—45)

ABSTRACT OF THE DISCLOSURE

A flow restrictor adapted for connection to a source of fluid supply of varying pressure comprising a housing having a central passage divided into a main duct and a bypass duct. A resilient diaphragm mounted within the bypass duct progressively deflects to reduce flow through the bypass duct thereby directing a greater proportion of the flow through the residual duct upon increase of fluid pressure.

---

This invention relates to flow restrictors for fluid supply systems or the like, intended to maintain a substantially constant rate of output flow of fluid despite variations in supply pressure of the fluid. In particular the invention relates to a water economizer intended for use in a water outlet such as a domestic water faucet or the like to permit substantial savings in the amount of water drawn therefrom.

Steadily increasing demand for water for industrial and domestic purposes has outpaced the increase of water supply leading to a shortage of water and consequent restrictions on the use of water. Such shortages have stimulated interest in devices intended to economize in the use of water and to prevent waste. Included among such devices are flow restrictors adapted for installation in fluid flow lines intended to deliver a constant output of fluid from a supply source despite variations in supply pressure.

Such flow restrictors are exemplified by a tubular body adapted for connection in the flow line and provided with a working element in the form of a relatively thick annular washer. The washer has a central passage through which the fluid flows and the washer is supported at its downstream end against movement. Under increasing fluid pressure exerted on the upstream surface of the resilient washer, it deforms thereby reducing the diameter of the passage in response to the increased pressure so as to maintain approximately the same rate of flow through the passage. Such flow restrictors suffer from the disadvantage that the washer used to control the flow of fluid does not deform at a uniform rate under pressure. A significantly greater increase in fluid pressure is required to cause a certain decrease in the size of the passage at high fluid pressures than is required to cause the same increment of size change at lower fluid pressures. This non-uniform rate of deformation also causes these flow restrictors to be insensitive to small changes in pressure, particularly at higher pressures. Furthermore, at extreme pressures the orifice sometimes entirely closes preventing any flow through the device thereafter. Accordingly, a real need has arisen for a flow restrictor capable of providing a particularly closely controlled, constant rate of fluid flow over a wide range of supply pressure and capable of providing continuing fluid flow even after the maximum controlled pressure has been exceeded.

In recognition of the need for an improved flow restrictor of the type heretofore described, it is an object of this invention to provide an improved flow restrictor.

It is a further object of the invention to provide a flow restrictor that delivers a substantially constant rate of total fluid flow from a supply source of varying pressure.

It is another object of the invention to provide a flow restrictor which is sensitive to slight fluid pressure variations and yet is durable.

It is still a further object of the invention to provide a flow restrictor which delivers a substantially constant flow over a wide range of supply pressure and provides continuing flow after the pressure range has been exceeded.

These objects are accomplished in accordance with a preferred embodiment of the invention by a housing having a longitudinal duct extending therethrough providing a passage for the total fluid flow. A by-pass duct and a residual duct in the housing divide the flow into a by-pass stream and residual stream, respectively. A pressure responsive resilient diaphragm is mounted on the housing within the by-pass duct. The diaphragm includes a free edge which deflects progressively in a downstream direction under increasing pressure. Shoulder means is provided in the by-pass duct adjacent the free edge of the diaphragm. The shoulder means is shaped to progressively diminish the gap between the free edge of the diaphragm and the shoulder means as the downstream deflection of the diaphragm edge increases under increasing pressure, so as to progressively reduce the effective area of the by-pass duct and the by-pass flow rate passing therethrough. A change in flow pressure displaces the free edge of the diaphragm and causes a change in the by-pass flow which is generally equal and opposite to the change in flow through the residual duct as a result of the same increase in pressure. Therefore, under low fluid pressure, the flow is diffused through the by-pass and residual ducts, but under high fluid pressure, flow is restricted to the residual duct.

This preferred embodiment is illustrated in the accompanying drawings in which.

Figure 1:
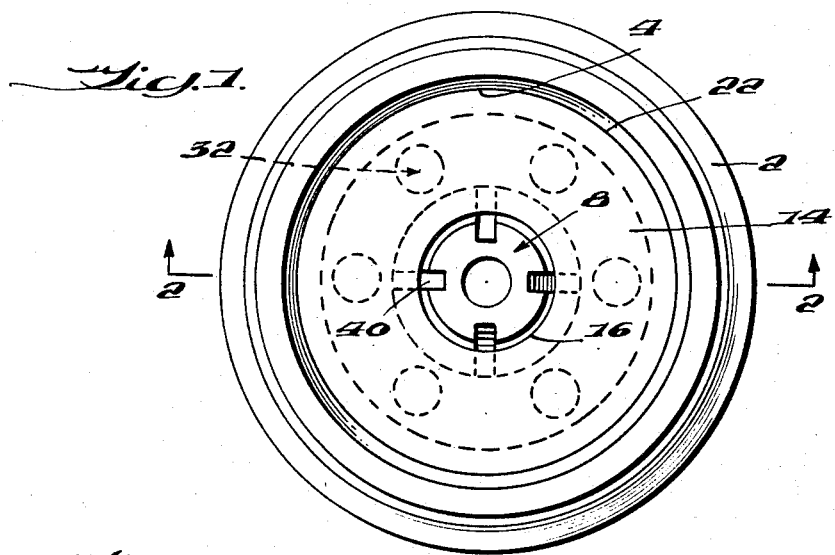
FIG. 1 is a top plan view of a flow restrictor according to the present invention.
Figure 2:
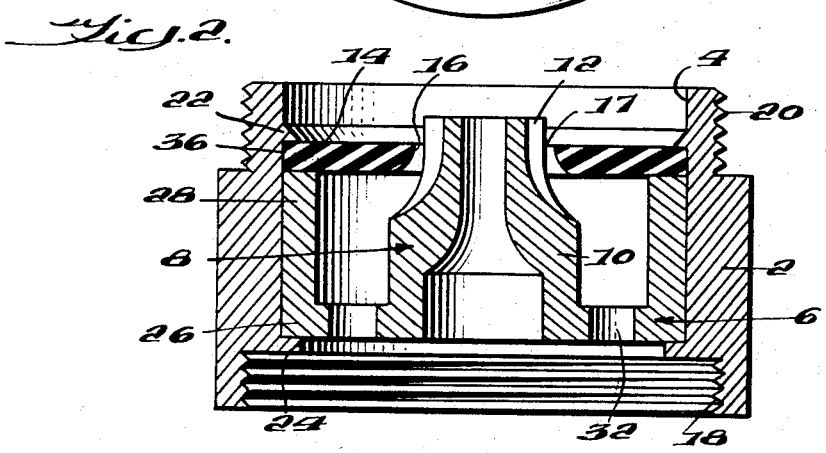
FIG. 2 is a cross sectional side view of the flow restrictor along the line 2—2 in FIGURE 1.
Figure 3:
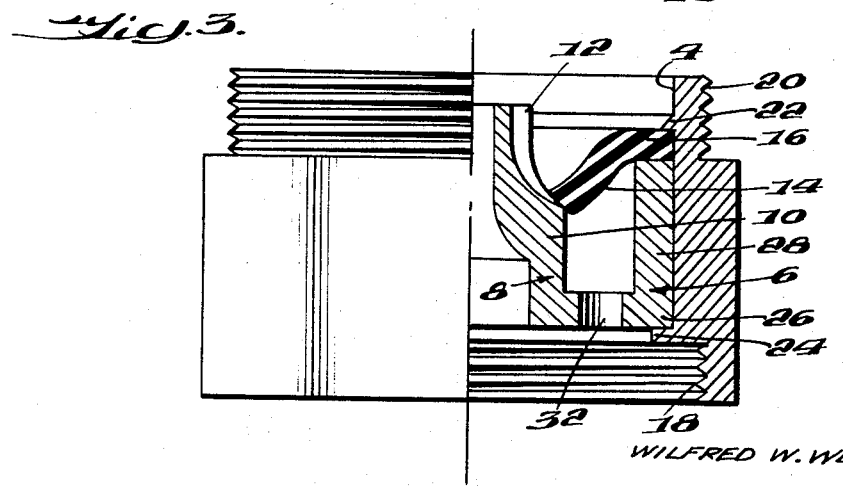
FIG. 3 is a partial sectional view of the flow restrictor along the line 2—2 in FIGURE 1 showing the diaphragm in its position of maximum deflection.

Referring to FIGS. 1 and 2 of the drawings, the flow restrictor includes a tubular housing 2 having a central duct 4 in which is positioned a generally cup-shaped inner member 6. The inner member 6 includes a tube 8 extending upstream which divides the flow into a residual flow through the center of the tube 8 and a by-pass flow between the outer surface of the tube 8 and the duct 4. Tube 8 comprises a base portion 10 and an upstream end portion 12 of reduced diameter. A resilient diaphragm 14 having a central hole defined by a deflectable inner edge 16, is positioned within the duct 4 adjacent the end portion 12 of the tube 8. The end portion 12 and the deflectable inner edge 16 of the resilient diaphragm 14 define a by-pass channel 17 controlling by-pass flow through the housing 2. The end portion 12 as described hereinafter, is so shaped as to cause a reduction in by-pass flow as edge 16 deflects downwardly under increasing fluid pressure.

Considering the housing 2 in more detail, it may be seen to comprise a longitudinally extending cylindrical body provided with internally and externally threaded portions 18 and 20 at its downstream and upstream ends, respectively, to enable the device to be inserted into any correspondingly threaded fluid supply pipe as for example a domestic water faucet. A radial flange 22 and a shoulder 24 in the housing 2 are in position for securing the diaphragm 14 and the inner member 6 in the housing 2. Upstream flange 22 is provided with a downwardly inclined upstream surface to enable a replacement diaphragm to be slipped thereover in a manner to be described hereinafter. Although the process of manufacture of the body 2 and the radial flange 22 form no part of the present invention, it will be appreciated that the flange 22 cannot be provided until the inner member 6 has already been slid into position within the housing 2 in abutting contact with the shoulder 24. At this time the flange 2 may be integrally secured to the interior of the housing 2 at an appropriate spacing above the upper end of the inner body 6 in any conventional manner such as, for example, by welding, brazing, or the like or by providing the flange 22 in the form of a resilient split ring engaging a radial groove provided in the housing 2 for the purpose of mounting the flange 22, or by other well known like methods.

The cup-shaped inner member 6 has a transverse wall portion 26 and a flange 28 about the periphery of the wall portion 26 and extending upstream therefrom. The wall 26 abuts the shoulder 24 to prevent the member 6 from being dislodged from the housing. To permit by-pass flow through the transverse wall, a plurality of radially spaced holes 32 is provided.

The upstream extremity of the flange 28 of the cup-shaped member 6 and the adjacent flange 22 on the housing define an annular channel 36 within the duct. Received within this annular channel 36 is the outer peripheral edge of the resilient diaphragm 14. The longitudinal extent of channel 36 is slightly less than that of the diaphragm 14 in its uncompressed state, so that installation of the diaphragm within the channel causes it to be compressed and thereby gripped securely about its periphery. The slight compression imparted to the outer periphery of the diaphragm 14 also ensures a good fluid tight seal between the diaphragm 14 and housing 2 and ensures a good fit of cup-shaped member 6 against shoulder 24. The downwardly inclined surface on the upstream face of the flange 22 enables a replacement diaphragm to be easily slid over the flange 22 into the channel 36.

The resilient diaphragm 14 includes a central hole defined by an inner edge 16 adjacent the end portion 12 of tube 8. The edge 16 is curved axially, as shown in FIG. 2, outwardly in a downstream direction to improve its sealing qualities against the downstream extremity of end portion 12. The edge 16 of the resilient diaphragm 14 and the outer surface of end portion 12 define a by-pass channel through which the by-pass flow passes.

In a first position in which the diaphragm is undeflected, the edge 16 is at a maximum radial spacing from the outer surface of end portion 12 so that the by-pass channel 17 is of maximum area. In a second position corresponding to the maximum deflection of edge 16 in which it abuts the outer surface of end portion 12 at its junction with base portion 10 in sealing contact therewith, the by-pass channel is closed. The end portion 12 intermediate the first and second end positions is shaped to progressively reduce the by-pass channel area with increasing downstream deflection of the edge 16 in such a manner as to direct a greater proportion of the flow through the residual duct in the tube 8.

In order to further increase the control over the by-pass flow, a plurality of radially disposed grooves 40 are provided in the surface of the end portion 12. The depth of each groove 40 decreases progressively from the plane of the undeflected diaphragm to the end of each groove 40 at the junction of the end portion 12 and the base portion 10. By-pass flow through the grooves is thus progressively reduced as the diaphragm edge 16 deflects.

The flow restrictor of this invention is effective in providing a diffused flow at low flow rates and a narrow stream at higher pressures and thereby conserves water or other fluids. By utilizing a thin diaphragm which deflects at a substantially uniform rate in response to increase in pressure, the sensitivity of the invention to small changes in fluid pressure is increased. Furthermore, by dividing total flow into an uncontrolled residual flow and a controlled by-pass flow, the diaphragm operates on only a portion of the total flow, thereby increasing its working life. The diaphragm may also be readily replaced, when worn due to the provision of sloping surfaces on the upper annular flange to guide the member into position.

Although the invention is described with reference to a preferred embodiment, it will be apparent to those skilled in the art that additions, deletions, modifications, substitutions and other changes not specifically described and illustrated in the preferred embodiment may be made which will fall within the purview of the claims.

I claim:
1. A flow restrictor adapated for connection to a source of fluid supply of varying pressure comprising:
  a housing having a longitudinally extending passage therethrough,
  means positioned within the passage for dividing the passage into a bypass duct and a residual duct,
  a resilient diaphragm mounted within the bypass duct,
  shoulder means on said dividing means,
  said diaphragm having an edge adjacent said shoulder means,
  said shoulder means and said edge defining a bypass channel for directing the bypass flow of fluid into the bypass duct, said free edge being deflected in a downstream direction proportionally in response to an increase in fluid flow in a downstream direction,
  said shoulder means being shaped to approach said edge of the diaphragm progressively during the downstream deflection of said edge under increasing pressure, said shoulder means further including:
    at least one axially extending grooved portion facing towards said edge of said diaphragm, said grooved portion being of progressively diminishing depth in a downstream direction,
  whereby an increase in flow progressively reduces the area of the bypass channel to direct a greater proportion of flow through said residual duct.
2. A flow restrictor as described in claim 1 wherein said dividing means comprises:
  an inner tube extending substantially within said passage,
  spacing means between said inner tube and said housing for maintaining said inner tube in spaced relation from said housing within said duct, said bypass duct being between said tube and said housing and said residual duct being within said inner tube.
3. A flow restrictor adapted for connection to a source of fluid supply of varying pressure comprising:
  a housing having a longitudinally extending passage therethrough,
  an inner tube extending substantially within said passage,
  spacing means within said inner tube and said housing for maintaining said inner tube in spaced relation from said housing to divide said passage into a by-pass duct between said tube and said housing and a residual duct within said inner tube,
  shoulder means on said inner tube,
  a resilient diaphragm fixedly secured to said housing within said passage, said diaphragm having a free edge adjacent said shoulder means,
  said free edge being deflected in a downstream direction proportionately in response to an increase in fluid flow in a downstream direction,
  said inner tube further including,
  an end portion and a base portion, said end portion being of reduced diameter and extending upstream from base portion,
  said shoulder means including an outer surface adjacent said free edge of said diaphragm,
  said outer surface being shaped to approach said free edge progressively during the downstream deflection of said free edge under increasing pressure to a position of abutting relation between said surface and said free edge adjacent the junction of said end portion and said base portion.

4. A flow restrictor as described in claim 3 including:
a groove in said outer surface of said end portion, said groove extending longitudinally of said bypass duct, and
said groove diminishing progressively in area from the plane of the undeflected diaphragm to the junction of said end portion and said base portion.

5. A flow restrictor as described in claim 3 including:
a groove in said outer surface of said end portion extended longitudinally of said bypass duct, said groove decreasing progressively in its depth below said outer surface from the plane of the undeflected diaphragm to the junction of said end portion and said base portion.

6. A flow restrictor as described in claim 3 wherein said edge of said diaphragm is curved radially outwardly in a downstream direction.

7. A flow restrictor adapted for connection to a source of fluid supply of varying pressure comprising:
a housing having a longitudinally extending passage therethrough,
an inner tube extending substantially within said passage, spacing means between said inner tube and said housing for maintaining said tube in spaced relation from said housing within said passage to divide said passage into a bypass duct between said tube and said housing and a residual duct within said inner tube,
shoulder means on said inner tube,
a resilient diaphragm fixedly secured to said housing, said diaphragm having a free edge adjacent said shoulder means, said shoulder means and said free edge defining a bypass channel for direction of bypass flow of fluid into said bypass duct, said free edge being deflected in a downstream direction proportionally in response to an increase of fluid flow in a downstream direction,
said shoulder means being shaped to approach said free edge of said diaphragm progressively during the downstream deflection of said free edge under increasing pressure whereby an increase in flow progressively reduces the area of said bypass channel to direct a greater proportion of flow through said residual duct, said spacing means further including,
an inner member positioned within said passage,
said inner member including a rear wall extending transversely of said housing,
said inner tube connected with and extending upstream from said rear wall, said tube including a central passage in fluid communication with both sides of said rear wall.

8. A flow restrictor as described in claim 7 wherein said spacing means further includes an axially-extending peripheral flange,
said peripheral flange including an upstream extremity abutting the downstream surface of said diaphragm, and
a flange in the housing adjacent the diaphragm,
whereby the peripheral edge of the diaphragm is secured between said housing flange and said inner member flange.

References Cited

UNITED STATES PATENTS

| | | | |
|---|---|---|---|
| 1,419,876 | 6/1922 | Mapelsden et al. | 138—44 |
| 2,389,134 | 11/1945 | Brown | 138—45 |
| 2,444,677 | 7/1948 | Rosenblum | 138—45 |
| 2,454,929 | 11/1948 | Kempton | 138—45 |
| 2,489,932 | 11/1949 | Rosenblum | 138—45 X |
| 2,500,750 | 3/1950 | Halenza | 138—45 X |
| 2,851,060 | 9/1958 | Fleischer | 138—46 |
| 2,878,836 | 3/1959 | Binks | 138—45 |
| 2,891,578 | 6/1959 | Dahl et al. | 138—45 |
| 2,936,788 | 5/1960 | Dahl et al. | 138—45 |
| 3,150,689 | 9/1964 | Lieberman | 138—30 X |

HOUSTON S. BELL, JR., *Primary Examiner.*